United States Patent
Wittke

(10) Patent No.: US 10,958,975 B2
(45) Date of Patent: Mar. 23, 2021

(54) METHOD AND APPARATUS FOR IDENTIFYING A SINGLE USER REQUESTING CONFLICTING CONTENT AND RESOLVING SAID CONFLICT

(71) Applicant: Rovi Guides, Inc., San Jose, CA (US)

(72) Inventor: David Wittke, Simi Valley, CA (US)

(73) Assignee: Rovi Guides, Inc., San Jose, CA (US)

( * ) Notice: Subject to any disclaimer, the term of this patent is extended or adjusted under 35 U.S.C. 154(b) by 33 days.

(21) Appl. No.: 16/366,085

(22) Filed: Mar. 27, 2019

(65) Prior Publication Data

US 2020/0314496 A1    Oct. 1, 2020

(51) Int. Cl.
| H04N 21/458 | (2011.01) |
| H04N 21/458 | (2011.01) |
| G06F 3/16 | (2006.01) |
| H04N 21/24 | (2011.01) |
| H04N 21/239 | (2011.01) |
| H04N 21/2387 | (2011.01) |
| G06F 9/451 | (2018.01) |
| G06F 13/10 | (2006.01) |

(52) U.S. Cl.
CPC ......... *H04N 21/4583* (2013.01); *G06F 3/165* (2013.01); *H04N 21/2387* (2013.01); *H04N 21/2393* (2013.01); *H04N 21/2408* (2013.01); *G06F 9/451* (2018.02); *G06F 13/10* (2013.01)

(58) Field of Classification Search
None
See application file for complete search history.

(56) References Cited

U.S. PATENT DOCUMENTS

| 6,177,931 | B1 | 1/2001 | Alexander |
|---|---|---|---|
| 6,774,926 | B1 | 8/2004 | Ellis |
| 7,415,119 | B2 | 8/2008 | Boss |
| 7,617,515 | B1 | 11/2009 | Laksono |
| 7,827,582 | B2 | 11/2010 | Ellis |
| 7,958,532 | B2 | 6/2011 | Paul |
| 8,185,927 | B2 | 5/2012 | Karaoguz |
| 8,375,414 | B2 | 2/2013 | Covey |

(Continued)

OTHER PUBLICATIONS

Shin et al., "Conflict Management for Media Services by Exploiting Service Profile and User Preferences", UbiPCMM, 2005 (Year: 2005).*

(Continued)

*Primary Examiner* — James R Marandi
(74) *Attorney, Agent, or Firm* — Haley Guiliano LLP

(57) ABSTRACT

Systems and methods for automatically determining when a single party is playing or requesting conflicting content on two different devices, and resolving the conflict accordingly. Systems automatically identify when a single user is playing back a content stream on one device, then requests another content stream on another device. If the two content streams conflict, the conflict is automatically resolved in a number of ways, including by automatically pausing or redirecting one of the content streams. Conflict identification may also be carried out with the assistance of an added state flag that indicates a device or stream that has audio priority in a conflict. Thus, for example, when one user requests two conflicting content streams, and only one stream is associated with the conditional audio enabled flag, audio of the flagged stream may be played, while the other stream is muted.

20 Claims, 12 Drawing Sheets

(56) References Cited

U.S. PATENT DOCUMENTS

| | | |
|---|---|---|
| 8,544,048 B2 | 9/2013 | Wiser |
| 9,940,188 B2* | 4/2018 | Prasad .................. G06Q 10/06 |
| 9,996,148 B1 | 6/2018 | Deramat |
| 2002/0164155 A1* | 11/2002 | Mate .................... H04N 21/436 386/240 |
| 2002/0174430 A1 | 11/2002 | Ellis |
| 2003/0005454 A1 | 1/2003 | Rodriguez |
| 2003/0106070 A1 | 6/2003 | Saam |
| 2004/0261113 A1 | 12/2004 | Paul |
| 2005/0160461 A1 | 7/2005 | Baumgartner |
| 2006/0136965 A1 | 6/2006 | Ellis |
| 2007/0033533 A1 | 2/2007 | Sull |
| 2007/0157260 A1 | 7/2007 | Walker |
| 2007/0157281 A1 | 7/2007 | Ellis |
| 2008/0137549 A1 | 6/2008 | Manthoulis |
| 2008/0301746 A1 | 12/2008 | Wiser |
| 2010/0005499 A1 | 1/2010 | Covey |
| 2010/0011390 A1 | 1/2010 | Coles |
| 2010/0023976 A1 | 1/2010 | Coles |
| 2010/0325666 A1 | 12/2010 | Wiser |
| 2015/0215382 A1* | 7/2015 | Arora ................. G06K 9/00288 382/118 |

OTHER PUBLICATIONS

Shin, et al., "Conflict Management for Media Services by exploiting Service Profile and User Preference," www.researchgate.net/profile/Woontack_Woo/publication/253116172_Conflict_Management_For_Media_Serviccs_by_exploiting_Service_Profile_and_Userk_Preference/Links/00b7d5295fdb21b0e6000000/Conflict-Management-for-Media-Services-by-exploiting-Serice-Profile-and-User-Preference.pdf (2005) (10 pages).

PCT International Search Report, International Application No. PCT/US2020/025052, dated Jun. 15, 2020 (16 pages).

* cited by examiner

| Device ID | Device Type | Device State |
|---|---|---|
| $DID_1$ | A/V | 1 |
| $DID_2$ | A | 1 |
| $DID_3$ | A/V | 0 |
| $DID_4$ | A | 1 |
| $DID_5$ | A/V | 0 |

FIG. 5A

| User ID | Associated Device ID(s) | Account IDs | Associated User Profile Pointer |
|---|---|---|---|
| $UID_1$ | $DID_1$ | $AID_1$, $AID_2$ | $P\_UID_1$ |
| $UID_1$ | $DID_2$ | - | |
| $UID_1$ | $DID_3$ | $AID_1$, $AID_3$, $AID_4$ | $P\_UID_1$ |
| $UID_1$ | $DID_4$ | $AID_1$, $AID_5$ | $P\_UID_1$ |
| $UID_2$ | $DID_3$ | $AID_3$, $AID_4$, $AID_6$ | $P\_UID_2$ |
| $UID_2$ | $DID_4$ | $AID_1$, $AID_6$ | $P\_UID_2$ |
| $UID_3$ | | | |

FIG. 5B

| Time | Content ID | Content Source/provider ID | Associated Device ID | Associated User ID | Associated Account ID | Content Type | Content State |
|---|---|---|---|---|---|---|---|
| $t_0$ | $CID_1$ | $CSID_1$ | $DID_1$, $DID_2$ | $UID_1$ | $AID_2$ | Audio_Book | 1 |
| $t_1$ | $CID_2$ | $CSID_2$ | $DID_4$ | $UID_1$ | $AID_5$ | Music | 1 |
| $t_2$ | $CID_3$ | $CSID_2$ | $DID_3$ | $?UID_1, ?UID_2$ | $AID_4$ | Video_Dialog | 0/1 |
| $t_3$ | $CID_4$ | $CSID_3$ | | | | | |
| $t_4$ | $CID_5$ | $CSID_4$ | | | | | |

FIG. 5C

|  | Audio_Book | Music | Video_Dialog | Video_Music_score_only | Music_Video | Audio_broadcast | Game_Dialog | Game_Music | Game_audio_mute | Images_no_audio | Video_audio_mute |
|---|---|---|---|---|---|---|---|---|---|---|---|
| Audio_Book | x | x | x |  | x | x | x | x |  |  |  |
| Music |  | x |  | x | x | x |  | x |  |  |  |
| Video_Dialog | x | x | x | x | x | x | x | x | x | x | x |
| Video_Music_score_only |  | x | x | x | x | x | x | x | x | x | x |
| Music_Video | x | x | x | x | x | x | x | x | x | x | x |
| Audio_broadcast | x | x | x | x | x | x | x | x |  |  |  |
| Game_Dialog | x |  | x | x | x | x | x | x | x | x | x |
| Game_Music | x | x | x | x | x | x | x | x | x | x | x |
| Game_audio_mute |  |  | x | x | x |  | x | x | x | x | x |
| Images_no_audio |  |  | x | x | x |  | x | x | x | x | x |
| Video_audio_mute |  |  |  |  |  |  |  |  |  |  |  |

FIG. 6

METHOD AND APPARATUS FOR IDENTIFYING A SINGLE USER REQUESTING CONFLICTING CONTENT AND RESOLVING SAID CONFLICT

BACKGROUND

Embodiments of the disclosure relate generally to content playback on electronic devices. More specifically, embodiments of the disclosure relate to identifying a single user requesting conflicting content and resolving that conflict.

SUMMARY

The wide availability and selection of digital content, combined with the large number of electronic devices available for its playback, mean that consumers may select and play desired content on several different screens. This allows users great flexibility in where and how they may view their content. Contemporary users can even elect to stream differing content on multiple devices simultaneously. For example, a user may discover interesting content on a laptop or tablet while listening to a podcast on his or her phone. Alternatively, users may wish to listen to background music while reading an e-book or articles online.

The ability to consume multiple different content streams concurrently is not without its difficulties, however. In particular, devices currently leave it to users to resolve their own conflicts, which can lead to excessive work and frustration. For instance, when users discover other content while listening to a podcast, they often want to pause the podcast while viewing the new content. In this manner, they can pick up on the podcast once they are finished with the new content. However, users currently must pause the podcast themselves. The need to manually implement content settings when multiple content streams are playing is, as above, a source of user frustration.

Accordingly, to overcome the problems and limitations of such services and their interfaces, systems and methods are described herein for a computer-based process that automatically determines when an individual is playing or requesting content playback on two different devices, determines whether the two content streams present a conflict, and if so, resolves the conflict. Conflict resolution may be performed by, for instance, pausing or muting one of the content streams. More specifically, a system automatically determines when a single user is requesting playback of content on two different devices, and determines whether the two content streams present a conflict. If so, the conflict is automatically resolved. For example, if the system determines that a single user is listening to a podcast on one device and decides to read an e-book on another device, the system recognizes that no conflict likely exists, as people can often read and listen simultaneously. However, if the system determines that the same user instead initiates a Ted Talk® video on laptop, a conflict is deemed to occur, as people typically cannot pay full attention to each of two simultaneous audio tracks containing speech. Accordingly, the podcast is automatically paused. Other examples exist and are further explained below.

In more detail, a list of users is maintained, and the system determines when a single user on the list is both playing a first content stream on one device and requests a second content stream on another device. If so, the system then determines whether the two content streams conflict. If no conflict is deemed to be present, both content streams are transmitted to the user. Conversely, if a conflict is deemed to occur, this conflict is resolved by pausing or redirecting one of the content streams.

The system does not require users to explicitly identify themselves when they are requesting content. Rather, the system automatically identifies the user associated with each requested content stream. Various methods may be employed to identify users. In one such method, information is stored associating each device with particular users and their user profiles. For example, the system can store a user identifier for each different user, a device identifier associated with each content playback device and with one or more user identifiers, account identifiers for user accounts of content applications (e.g., user Netflix® accounts), and user profiles for each user or user identifier.

This stored information may be used to identify users of each device. For instance, the device identifier associated with a device currently requesting content can be determined. If only one user identifier is associated with this device identifier, it may be deemed that the user corresponding to that user identifier is the one currently utilizing the device. Alternatively, if more than one user identifier is associated with the current device identifier, the correct user identifier may be determined according to a comparison of the content currently being requested to the user profiles of the various users associated with the current device identifier. That is, if more than one user identifier is associated with the current device identifier, the user profiles corresponding to each of these user identifiers are examined to determine which compares most closely to the content currently being requested. The user whose profile most closely lines up with the current content is deemed to be the current user.

Various embodiments also contemplate use of any other approach for determining the identity of a user from content being requested and/or the device it is requested on. The above approaches, and any others, may be used to determine the identity of the user of any device. That is, when content is requested on two different devices, the above and other methods may be employed for each device, to separately determine the identity of each device's user. If the determined users of the two devices are the same, then it is also determined that the same user is requesting simultaneous playback of two different content streams on two different devices.

In one embodiment, a check is first performed to determine whether the content requested is the type of content that the identified user would typically request. If not, then it is deemed that a different user is requesting content. That is, a first user requesting content on a first device is identified. When content is requested on a second device, and it is initially determined that the same user is requesting content on both devices, a check is performed to verify that the same user is requesting content on the second device. This check is performed by comparison to the user profile of the identified user. As one example, the account identifier associated with the request for content on the second device can be determined, as can the user identifier associated with this account identifier. The corresponding user profile is then determined, and the content requested on the second device is compared to the user profile, to determine whether the content matches a content profile listed in the user profile, i.e., a description of the content that the user prefers. If the content matches that listed in the user profile, i.e., the content matches that which the user prefers, then it is confirmed that the user of the second device is the same as that of the first device. Conversely, if the content does not match the user profile, then it is deemed that a different user is requesting content on the second device, and thus no conflict exists.

Once it is confirmed that the same user is streaming content on two different devices, the presence or absence of a conflict is determined. To assist in conflict determination, an audio/video type identifier is stored for each device identifier, where the audio/video type identifier is an indicator of the type of content the device is currently playing. Accordingly, the type identifier can be one of audio only, video only, and audio and video. The type of content playing on a device is then determined, and the type identifier for that device is set accordingly. In this manner, conflict can be determined by examination of the type identifiers currently set for two devices. When the audio/video type identifier of the first device is the same as that of the second device, i.e., each device on which content is requested has the same user and the same type identifier, it is determined that a conflict exists. That is, if each device has its type identifier set to audio only, or each is set to video only, or each is set to audio and video, then the two content streams are deemed to interfere with each other, representing a conflict. For example, two audio only streams, such as two simultaneous podcasts, would be difficult for a single user to listen to, and are thus deemed to conflict. Likewise, two video-and-audio streams, such as two movies, would present the same difficulty and would also be deemed to conflict.

One way of resolving such a conflict involves a secondary audio or video output. That is, conflicts between content streams can be resolved by providing another audio or video output to which one of the conflicting audio/video streams can be directed. Once an audio conflict is determined, and if a secondary audio output is available, the audio signal of the first content stream, or the audio of the first device, is directed to the secondary audio output. If no secondary audio output is available, audio of the first device can be halted (first device muted) while its video stream continues. Thus, for example, if a user is listening to streaming music on headphones, and starts a podcast on another device, the music is redirected to a less intrusive audio output such as room speakers. Meanwhile, the podcast can play on the second device, or be directed through the headphones connected to the first device. Similarly, once a video conflict is determined, and if a secondary video output is available, the video signal of the first content stream, i.e., the video of the first device, is directed to the secondary video output. If no such secondary video output is available, video of the first device can be halted while its audio stream continues.

Another approach to conflict resolution involves use of a state flag that designates a particular device or content stream as having audio priority in a conflict. More specifically, when two conflicting content streams are requested, and one is flagged as having the audio priority state, the flagged audio stream is played and the unflagged stream is paused or muted. Thus, it is determined when a single user is playing a first content stream on a first device and concurrently requests playback of a second content stream on a second device. When this is determined to occur, and when one of the devices/streams is flagged as having this audio priority state while the other is not, both audio and video of the flagged device/stream are played, while only the video and not the audio of the unflagged device/stream is played. This state may be referred to as a "conditional audio enabled" state. Thus, in a conflict, the conditional audio enabled device or stream would have both its audio and video played, while the conflicting device or stream would have only its video played.

Either devices or content streams can be flagged conditional audio enabled. That is, any of the above described first device, second device, first content stream, and second content stream can be labeled or flagged as conditional audio enabled.

The conditional audio enabled flag can be used to resolve conflicts in multiple different ways. As one example, if both devices, or both content streams, are flagged conditional audio enabled, and the two streams are deemed as conflicting, the conflict can be resolved by pausing playback of the first content stream on the first device while playing back the content stream on the second device. That is, in a conflict between two conditional audio enabled devices or streams, the later device/stream is played while the earlier one is paused. As another example, if both devices or both streams are flagged conditional audio enabled as above, but the first stream is paused before the second stream is requested, the second stream is played while the first stream is kept as paused. Conversely, if neither device and neither stream is flagged as conditional audio enabled, the first content stream is paused while the second stream is played back. That is, when no device or content stream is flagged as conditional audio enabled, conflicts are resolved by prioritizing the second device/stream over the first.

As still another example, if the first device or content stream is flagged as conditional audio enabled but the second device or stream is not, and the first device is playing the video but not the audio of its content stream, the conflict is resolved by pausing video of the first content stream, playing the audio of the first content stream, and playing the video but not the audio of the second content stream. That is, conflict is resolved by playing the audio of the first stream, and video of the second stream. In another similar example, if the first device or stream is flagged as conditional audio enabled but the second device/stream is not, the second device is playing video but not audio, and the first stream is paused, the second stream is played in whole (audio and video). That is, if the user pauses the first stream, both audio and video of the second stream are played, as no conflict exists anymore.

If a device is playing audio only, or if a content stream is an audio only stream such as a podcast, the device or stream can be designated conditional audio enabled. As the device/stream plays only audio, its audio should be given priority.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which:

FIGS. 5A, 5B, and 5C are exemplary device, user, and content manifests respectively, for user identification and conflict determination according to embodiments of the disclosure;

FIG. 6 is an exemplary conflict table for determining conflicts between various types of content;

DETAILED DESCRIPTION

In one embodiment, the disclosure relates to systems and methods for automatically determining when a single party is playing or requesting conflicting content on two different devices, and resolving the conflict accordingly. Users that play back a content stream on one device, then request another content stream on another device are identified. If it is determined that the same user is requesting or playing back both content streams on both devices, a determination is made whether the two content streams conflict. If so, the conflict is automatically resolved in a number of ways, including by automatically pausing or redirecting one of the content streams.

Conflict identification may be carried out with the assistance of an added state flag that can be applied to either devices or content streams. This flag, which can be referred to as a "conditional audio enabled" flag, indicates a device or stream that has audio priority in a conflict. Thus, as an example, when one user requests two conflicting content streams, and only one stream is associated with the conditional audio enabled flag, the flagged stream plays at least its audio, while the other stream is muted.

Figure 1:
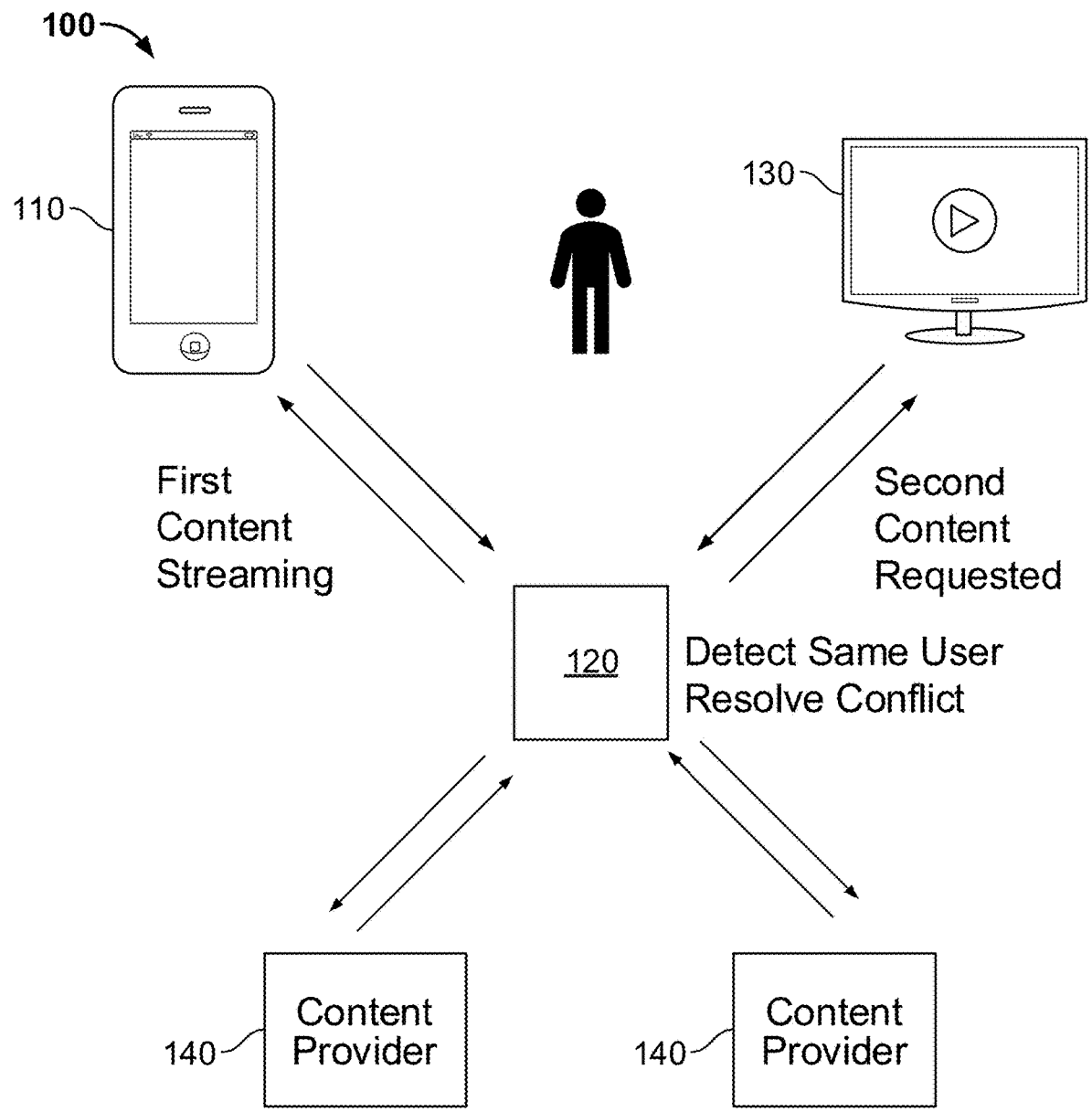
FIG. 1 illustrates an exemplary system for detecting and resolving conflicts when a user simultaneously requests content on different devices, in accordance with embodiments of the disclosure.

FIG. 1 illustrates an exemplary system for detecting and resolving conflicts when a user simultaneously requests content on different devices, in accordance with embodiments of the disclosure. Here, system 100 includes a first content consumption device 110 and a second content consumption device 130 both being used by the user shown. First and second content consumption devices 110, 130 each communicate with content direction device 120, which receives and forwards content streamed from content providers 140. In other words, content direction device 120 receives content from content providers 140 and transmits it on to the content consumption devices 110, 130 currently used by a user.

In operation of system 100, a user may be, for example, listening to a podcast on first content consumption device 110, which may be his or her phone. The podcast is streamed from the leftmost content provider 140 to content direction device 120, which in turn transmits the stream to the user's phone. While listening to the podcast, the user also requests content on second content consumption device 130, which may be his or her TV, or alternatively may be a laptop or tablet computer. The user may request, for example, a Netflix® show on device 130. In response, the content direction device 120 automatically determines whether the user of device 130 is the same user as that of device 110. If not, i.e. content is being requested by two different users, the content direction device 120 finds that no conflict is occurring, and transmits two content streams from the respective content providers 140 to the devices 110 and 130. Conversely, if device 120 determines that the same user is the one requesting content on both devices 110 and 130, the device 120 then determines whether the two content streams, i.e. a podcast and a Netflix® show, present a conflict. As both streams include audio, a conflict likely occurs, as the user would be forced to listen to two different sources of dialog at the same time, which is often difficult. In this case, the content direction device 120 automatically resolves the conflict. Resolution of conflicts can be performed in any number of different ways. For example, content direction device 120 may pause one of the streams, mute one of the streams, or direct the audio of one stream to a different audio output device not shown.

Figure 2:
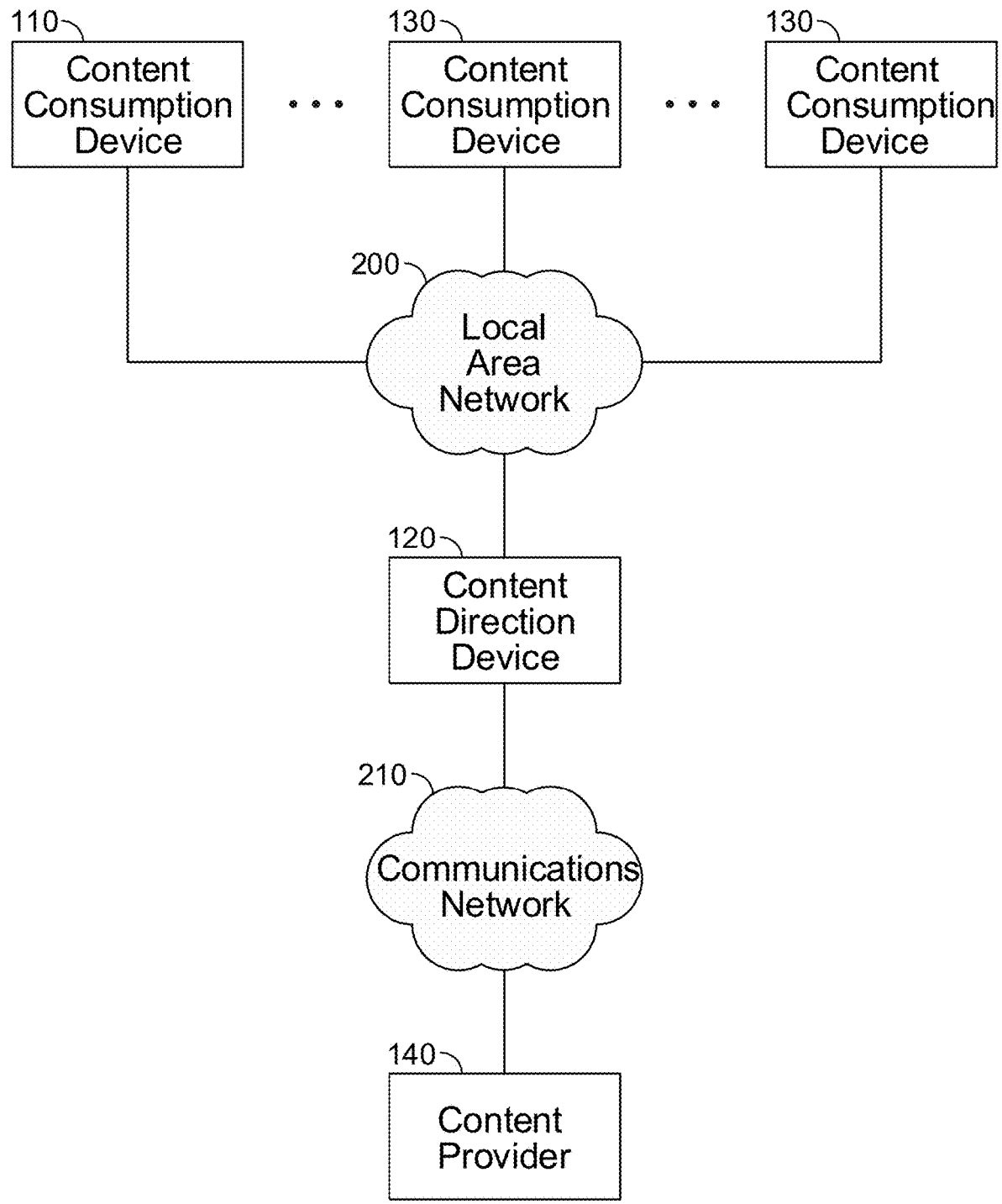
FIG. 2 is a block diagram illustration of the system of FIG. 1.

FIG. 2 is a block diagram representation of the system of FIG. 1, presented for further illustration. Any number of content consumption devices 110 and 130 may be in communication with content direction device 120 through, for example, a local area network 200. The content direction device 120 is in electronic communication with content provider 140 through communications network 210. As one example, the content consumption devices 110 and 130, local area network 200, and content direction device 120 may all be situated within a local area, e.g., within various rooms of a home or office. The content provider 140 may be a remotely located server at a content provider site, and the communications network 210 may be the public Internet. Alternatively, the content provider 140 may be situated within the local area and may be, for example, a local content storage and streaming application on a local computer including any of the above computing devices, or even a storage and application within the content direction device 120 itself. As in FIG. 1, multiple content providers 140 may be in communication with content direction device 120 through communications network 210.

As above, a user may be watching a show on first content consumption device 110, at which point the content provider 140 is providing a stream of the show through communications network 210 to content direction device 120. The content direction device 120 in turn receives this stream and directs it to device 110 over local area network 200. When the user requests another show or other stream on one of the second content consumption devices 130, the content direction device 120 verifies that the same user is the one requesting content on both devices 110 and 130. Upon verification that it is the same user, the content direction device 120 determines whether the two streams conflict and, if so, resolves the conflict. As above, resolution of the conflict can be performed in different ways, including pausing the stream directed to device 110, pausing the stream directed to device 130, directing the audio stream of the first device 110 to another device, or the like.

Figure 3:
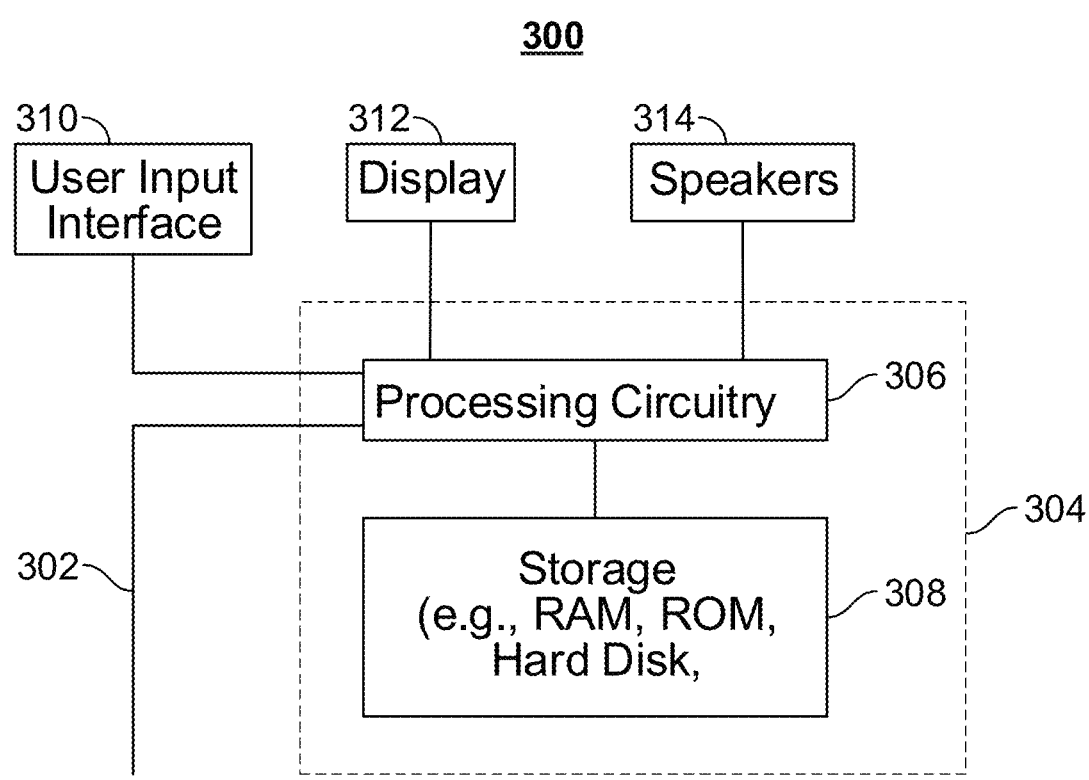
FIG. 3 is a generalized embodiment of illustrative content consumption devices constructed for use according to embodiments of the disclosure.

The content consumption devices 110, 130 may be any devices capable of receiving streamed content and executing playback for users. For example, content consumption devices 110, 130 may be digital TVs, laptop computers, smartphones, tablet computers, or the like. FIG. 3 shows a generalized embodiment of an illustrative user equipment device 300 that may serve as a content consumption device. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for receiving streamed content and executing playback, such as executing application programs that provide interfaces for content providers 140 to stream and display content.

Control circuitry 304 may thus include communications circuitry suitable for communicating with a content provider 140 server or other networks or servers. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be included. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

Figure 4:
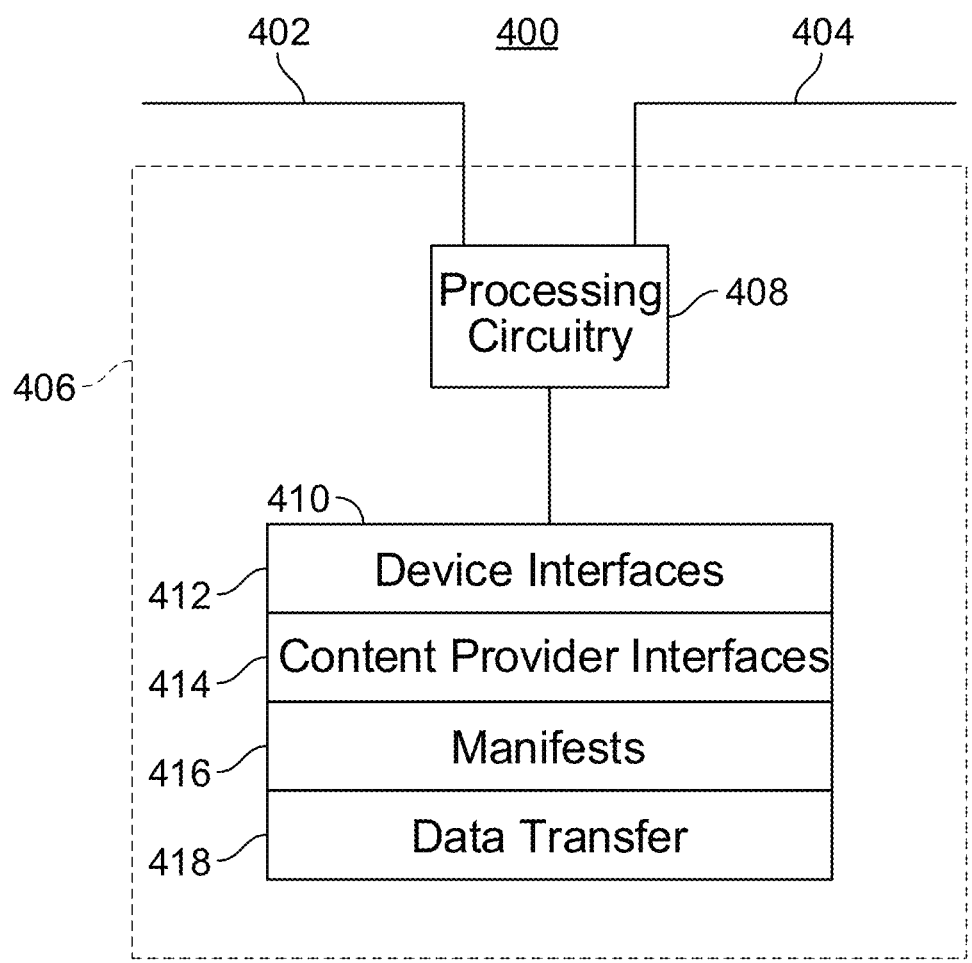
FIG. 4 is a generalized embodiment of an illustrative content direction device constructed for use according to embodiments of the disclosure.

FIG. 4 is a generalized embodiment of an illustrative content direction device 120 constructed for use according to embodiments of the disclosure. Here, device 400 may serve as a content direction device. Device 400 may receive content and data via I/O paths 402 and 404. I/O path 402 may provide content and data to the various content consumption devices 110 and 130, while I/O path 404 may provide data to, and receive content from, one or more content providers 140. Like the user equipment device 300, the device 400 has control circuitry 406 which includes processing circuitry 408 and storage 410. The control circuitry 406, processing circuitry 408, and storage 410 may be constructed, and may operate, similar to the respective components of user equipment device 300.

Storage 410 is a memory that stores a number of programs for execution by processing circuitry 408. In particular, storage 410 may store a number of device interfaces 412, content provider interfaces 414, manifests 416 described further below, and data transfer routines 418. The device interfaces 412 are interface programs for handling the exchange of commands and data with the various content consumption devices 110, 130. Content provider interfaces 414 are interface programs for handling the exchange of commands and content streams with various content providers 140, and are programmed to exchange commands and content similar to a corresponding application program on a content consumption device 110, 130. A separate interface 414 may exist for each different content provider 140 that has its own format for commands or content. Data transfer module 418 handles routing of content streams from the content providers 140 to the appropriate content consumption devices 110, 130. That is, module 418 contains routines for redirecting content streams received from content providers 140 to specific content consumption devices 110, 130. If content is stored within device 400 itself, it may be stored in storage 410 along with an application program that streams the stored content to a destination specified as below.

The device 400 may be any electronic device capable of receiving content streams and transferring them to one or more content consumption devices 110, 130. For example, the device 400 may be a networked in-home smart device connected between a home modem and various content consumption devices 110, 130. The device 400 may alternatively be a laptop computer or desktop computer configured as above.

FIGS. 5A-5C are exemplary manifests 416 for user identification and conflict determination according to embodiments of the disclosure. The manifests 416 shown in FIGS. 5A-5C are device, user, and content manifests respectively. FIG. 5A illustrates an exemplary device manifest which stores device identifiers DID and the associated device type and device state. Each device identifier DID corresponds to a single content consumption device 110, 130. That is, each device 110, 130 is assigned a unique identifier DID. The device type describes the mode or modes that the device can play, i.e., audio (A), video (V), or audio and video (A/V). The device state indicates whether the corresponding device is currently receiving a content stream or not. Thus, the device manifest of FIG. 5A can be stored as one of the manifests 416 to indicate to processing circuitry 408 that three devices, $DID_1$, $DID_2$, and $DID_4$ are connected to content direction device 400 and currently receiving content, where $DID_1$ is receiving audio and video streams, while $DID_2$ and $DID_4$ are both receiving only audio streams.

The content direction device 120 constantly maintains and updates its device manifest as the devices connected thereto, and their states, change with time. The device 120 may construct and maintain its device manifest in any manner. In one embodiment, device 120 detects each content consumption device 110, 130 as it powers on and registers with local area network 200, and assigns each device 110, 130 a unique number. The state and type fields can be updated when the device 120 transmits content to the corresponding content consumption device 110, 130.

FIG. 5B illustrates an exemplary user manifest which relates users to their devices, accounts, and user profiles. Each user is assigned a unique user identifier UID. Each user identifier UID is associated with one or more device identifiers DID, corresponding to the devices that the user has used at one time. The user manifest also stores account identifiers AID for each account maintained by one of the users with one of the content providers 140. Additionally, the user manifest stores pointers to user profiles P_UID, which are unique user profiles for each user. The user profiles may also be stored in storage 410 or elsewhere as appropriate.

The user manifest can be built over time, as various users use the devices 110, 130. Initially, each device 110, 130 can be assigned one user UID, and as users add accounts, the account identifiers AID are stored for each device DID that account is used on. A user profile UID is generated or retrieved for each UID, along with a pointer P_UID to that profile. Users can be added as new users register, new devices are added, as new accounts are added, or as comparison of the user profiles indicates that someone is requesting content that does not fit any existing user profile. The determination of a new user by negative comparison to existing profiles is known, and any such method is contemplated by the instant disclosure.

FIG. 5C illustrates an exemplary content manifest which is a record of devices that play content. When a device begins playing back content, the processor 408 records the time t at which playback begins, a content identifier CID from the content provider 140 or perhaps metadata of the content stream, the content provider 140 identifier CSID, associated device identifier DID, user identifier UID of the user determined to be requesting the content, content type, and content state. The content type is a type identifier for the content, taken from the content provider 140, stream format, or metadata, and is used in determining whether a conflict exists, as is further described below. The content state indicates whether the content is currently being streamed, and can indicate which stream (e.g., audio or video) is being streamed and which is not. For example, in the content manifest of FIG. 5C, device $DID_3$ begins streaming a video at time $t_2$, with the audio muted (0) but the video playing (1). The video is played from account $AID_4$, which is associated with users $UID_1$ and $UID_2$ although it cannot be determined which user was using the account at that time. The content manifest is updated when a new content stream begins or changes state, i.e., is paused, stopped, muted, or the like.

Storing the information in the manifests of FIGS. 5A-5C allows the content direction device 120 to determine when a single user is requesting content on two different devices. When the content direction device 120 receives a request to stream content, it determines the device identifier DID of the device from which it receives the request, and the account identifier AID of the account that generated the request. From this information, corresponding user identifiers UID are determined with reference to the manifest of FIG. 5B. If only one user identifier UID is associated with the device that requested the content, or only a single UID is associated with the AID that generated the request, that user can be deemed to be the user currently requesting content. If multiple UIDs are associated with the DID and AID, the correct user is determined from among the common users by comparison of the requested content to the user profiles (retrieved with associated pointer P_UID) of each common user. The profile expressing a preference for content that most closely matches the requested content may be deemed to identify the correct user. Such user identification processes are known. The present disclosure contemplates the selection of a correct user from among multiple candidates, with reference to user profiles, in any manner. The user identification steps herein may also be repeated when content is requested on a second device, to identify when the same user is simultaneously requesting two different content streams on two different devices.

Once it is determined that a single user is simultaneously requesting two different content streams on two different devices, it is then determined whether these two streams present a conflict. In one embodiment, this determination is made with reference to a conflict table which describes the situations in which a conflict is, or is not, deemed to occur. FIG. 6 is an exemplary conflict table for determining conflicts between various types of content. The table can be stored along with the manifests 416 as part of storage 410.

The table lists content types on each axis, with conflicting content types indicated with an "x". Each axis represents one content stream on one device. In operation, processor 408 determines a conflict by consulting the content manifest of FIG. 5C to determine the content type of the currently playing stream, and determines the content type of the requested stream. The processor 408 then looks up the two content types on the table of FIG. 6 to determine whether a conflict exists, i.e., whether the corresponding table entry has an "x" or not. Thus, for example, a first device playing a video with dialog (Video_Dialog) would represent a conflict with a second device that requests play of an audio book (Audio_Book), as both have audio streams that would be difficult for a single user to follow when played simultaneously. Conversely, a first device playing an audio book (Audio_Book) and a second device requesting play of a video with muted or no audio (Video_audio_mute) does not present a conflict, as one is audio-only and the other is video-only. It is noted that the information of FIG. 6 is exemplary, and embodiments of the disclosure encompass conflicts determined in any manner. In particular, the table of FIG. 6 may vary in different embodiments, with conflicts found for different combinations of content types than those of FIG. 6.

Figure 7:
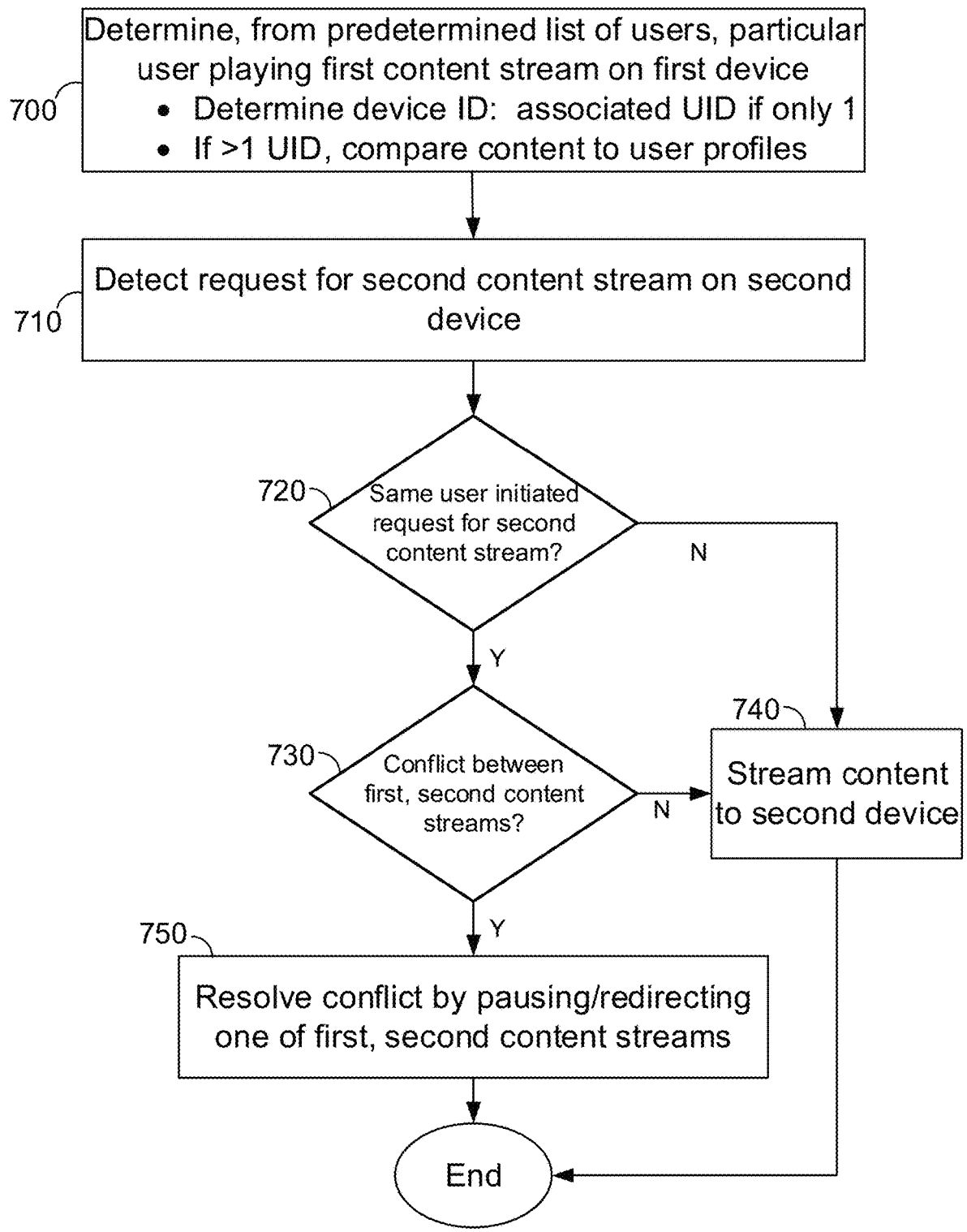
FIG. 7 is a flowchart illustrating process steps for detecting and resolving conflicts when a user simultaneously requests content on different devices, in accordance with embodiments of the disclosure.

Attention now turns to further details of the processes of the disclosure. FIG. 7 is a flowchart illustrating process steps for detecting and resolving conflicts when a user simultaneously requests content on different devices, in accordance with embodiments of the disclosure. From a predetermined list or set of users, a particular user playing a first content stream on a first device is determined (Step 700). As above, content direction device 120 stores user identifiers UID each associated with a different user, device identifiers DID each associated with a different content consumption device 110 or 130 and each associated with one or more UIDs, account identifiers AID each associated with a user identifier UID and identifying a user account of one of the content providers 140, and user profiles (pointed to by user profile pointers P_UID) each associated with a UID. These identifiers may be stored in storage 410 in the form of the manifests of FIGS. 5A-5C, although the disclosure encompasses storage of such identifiers in any manner and within any data structures which are retrievable for use in identifying which users are using which content consumption devices 110, 130.

The stored identifiers are used as above, to determine which UID is associated with the first content stream on the first device 110, 130. As above, if there is only one UID associated with the DID of the first device, then this UID may be deemed as the UID of the user requesting the first content stream. If more than one UID is associated with the DID, then the correct UID is determined by comparing the content of the first content stream to the user profiles of those UIDs associated with the DID.

Once the correct UID for the first content stream is determined, the content direction device 120 may detect a request for a second content stream on a second content consumption device 110, 130 (Step 710). The UID for this request can be determined in the same manner as for the first content stream, or alternatively may be determined as further explained below. A comparison between the two UIDs is then made (Step 720). If the two UIDs are not the same, then the two content consumption devices 110, 130 are being watched by two different users, and there is no conflict. The second content stream is then streamed to the second device 110/130 (Step 740), whereupon the process ends. However, if the two UIDs are the same, then the same user is deemed to be requesting two different content streams, raising the possibility of a conflict. The content type of each stream is retrieved, and the table of FIG. 6 is consulted to determine whether a conflict is presented (Step 730). If not, then the process continues to Step 740, and the second content stream is streamed to the second device 110/130. On the other hand, if a conflict is determined to exist according to, e.g., the information of FIG. 6, the content direction device 120 automatically resolves the conflict (Step 750). Conflict resolution is accomplished in any manner. As one example, the first stream may simply be paused while the second stream is played on the second device, or conversely the second stream may be loaded in a pause state, i.e. immediately paused once streaming has begun, with the option given to resume playback, whereupon the first stream may be paused. Alternatively, the first stream/device may be muted when streaming of the second stream commences. That is, the first video stream may continue to be played while the first audio stream is paused, and both the audio and video streams of the second content stream commence streaming. Other approaches for conflict resolution are further described below. The embodiments of the disclosure contemplate all these and other approaches to conflict resolution.

Figure 8:
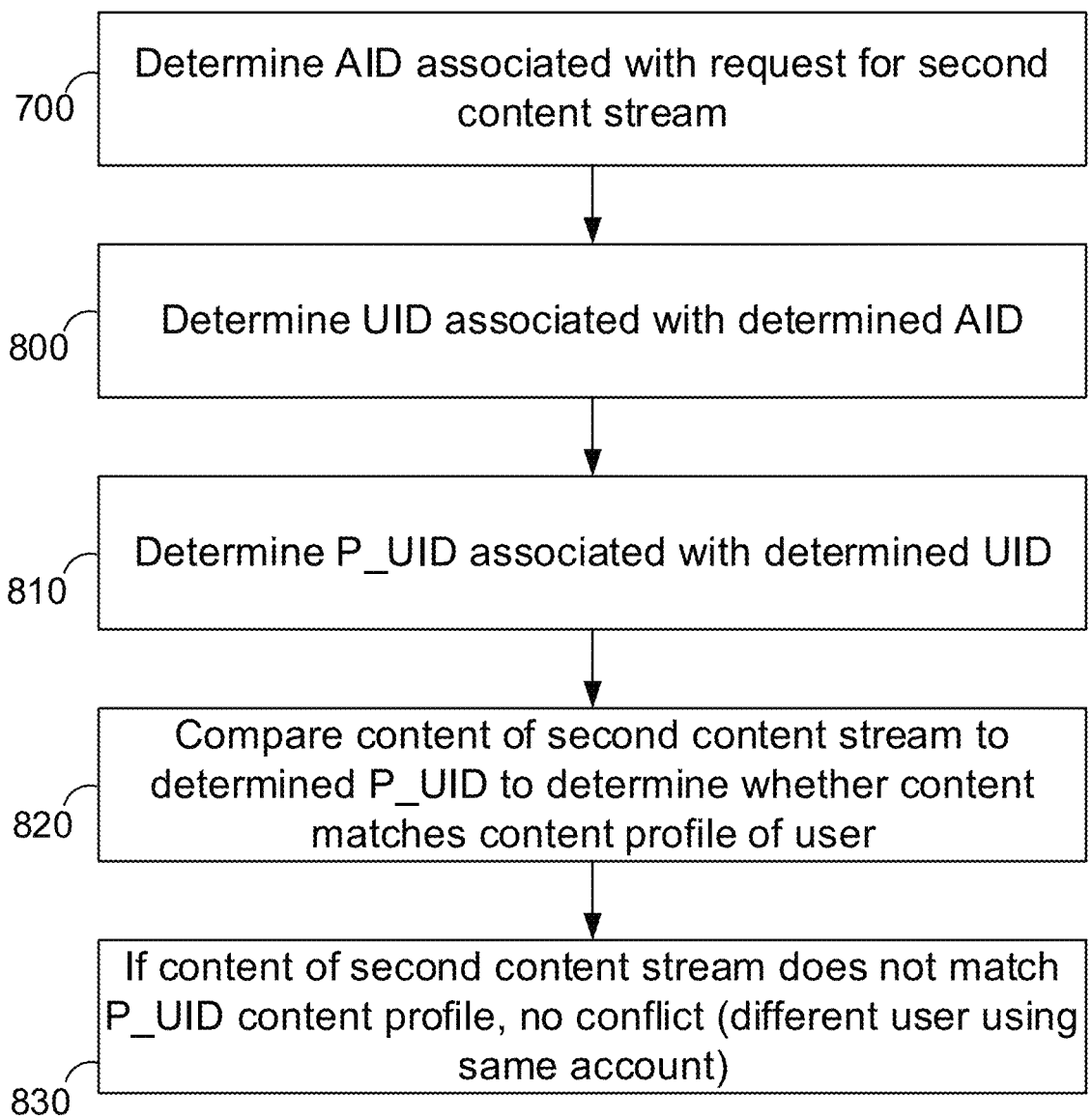
FIG. 8 is a flowchart illustrating process steps for verifying whether a conflict exists.

As above, when the content direction device 120 receives a request for a second content stream on a second device, the content direction device 120 determines whether the request originates from the same user as requested the first content stream on the first device. This corresponds to Step 720 of FIG. 7. This Step may be carried out in any manner, such as by the processes described above. FIG. 8 is a flowchart illustrating further details of an exemplary process for determining the identity of the user requesting the second content stream. Once the content direction device 120 receives a request for a second content stream on a second device 110/130, the device 120 determines the account identifier AID associated with the request for the second content stream, i.e., the AID of the account from which the request was issued. This was previously described above with reference to Step 700. From this AID, the content direction device 120 determines the associated UID (Step 800). As above, there may be more than one associated UID.

If so, the device 120 then determines the user profiles of each associated UID, using the pointers P_UID to each associated UID (Step 810). The content of the second content stream is then compared to each user profile, to determine whether the content matches the content profile of the user (Step 820). This comparison can be performed in any manner. For example, user profiles may contain a list of content genres that the associated user prefers, or a list of genres that the user does not wish to watch. The genre or genres of the second content stream (as determined, for instance, from metadata of the second content stream or from the content server 140) can thus be compared to each user profile's lists to determine a match. The user profile whose lists most closely match the genre(s) of the second content stream can be deemed to be the user profile of the user requesting the second content stream. Alternatively, if the content of the second content stream does not match any lists of the user profiles, i.e. if the requested content does not fit the profile of any associated user, the content direction device determines that a different user is requesting the second content stream, and thus that no conflict exists (Step 830).

The steps of FIG. 8 may be performed as above in connection with Step 720, once the second content stream is requested. Alternatively, or in addition, the steps of FIG. 8 may also be performed after Step 720 is complete, i.e., after it is determined (through some other manner besides the process of FIG. 8) that the same user is requesting both content streams. For example, the steps of FIG. 8 may be performed as a check to verify that the determination of a same user for both content streams is indeed correct. Thus, for example, Step 720 may determine a same user by determining that only one UID is associated with the second device 110/130, but then the process of FIG. 8 may be carried out to determine that the user requesting the second content stream is actually different from that of the first content stream. This may occur, for instance, when the owner of a device 110/130 lends it to his or her child, who then requests content using the owner's account. In this situation, Step 720 may determine that the same user is requesting the second content stream, since the device and the account used to request the second stream are both associated with the owner. However, the process of FIG. 8 may then determine that the actual user is the owner's child, based on the child requesting content different from that which the owner typically requests (e.g., children's programs).

Figure 9:
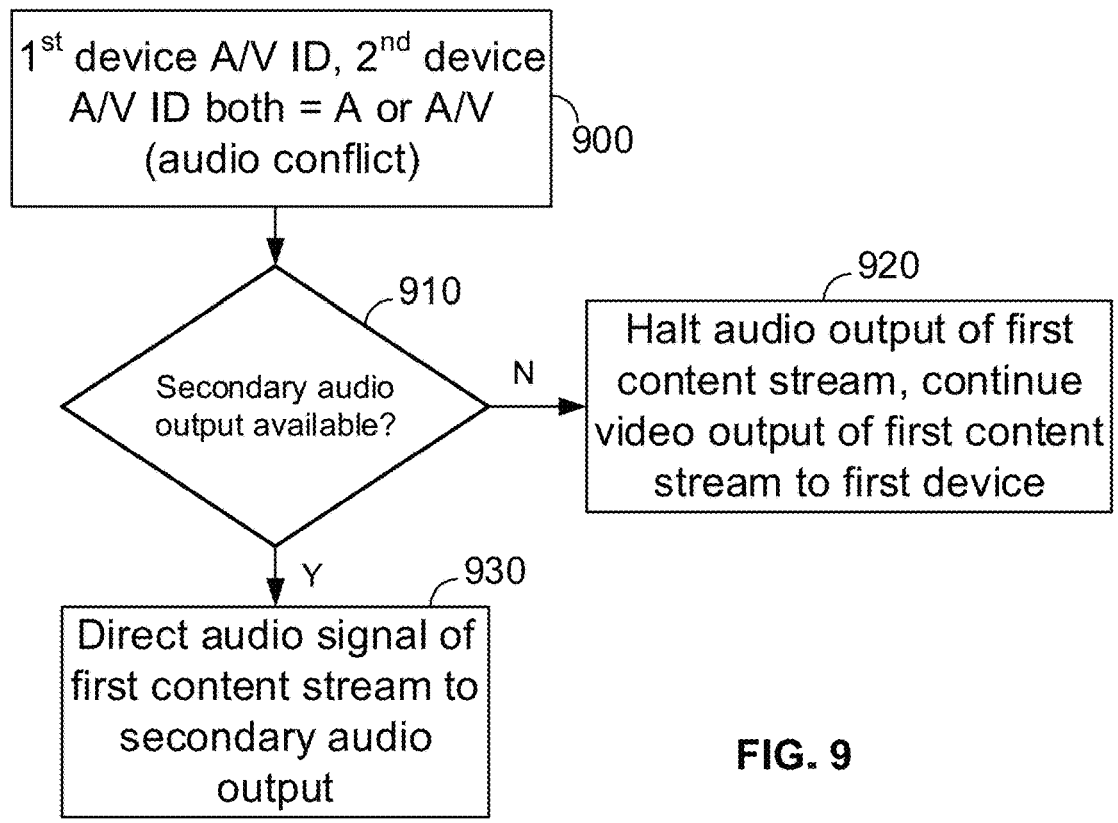
FIG. 9 is a flowchart illustrating process steps for conflict resolution with and without a secondary audio output.
Figure 10:
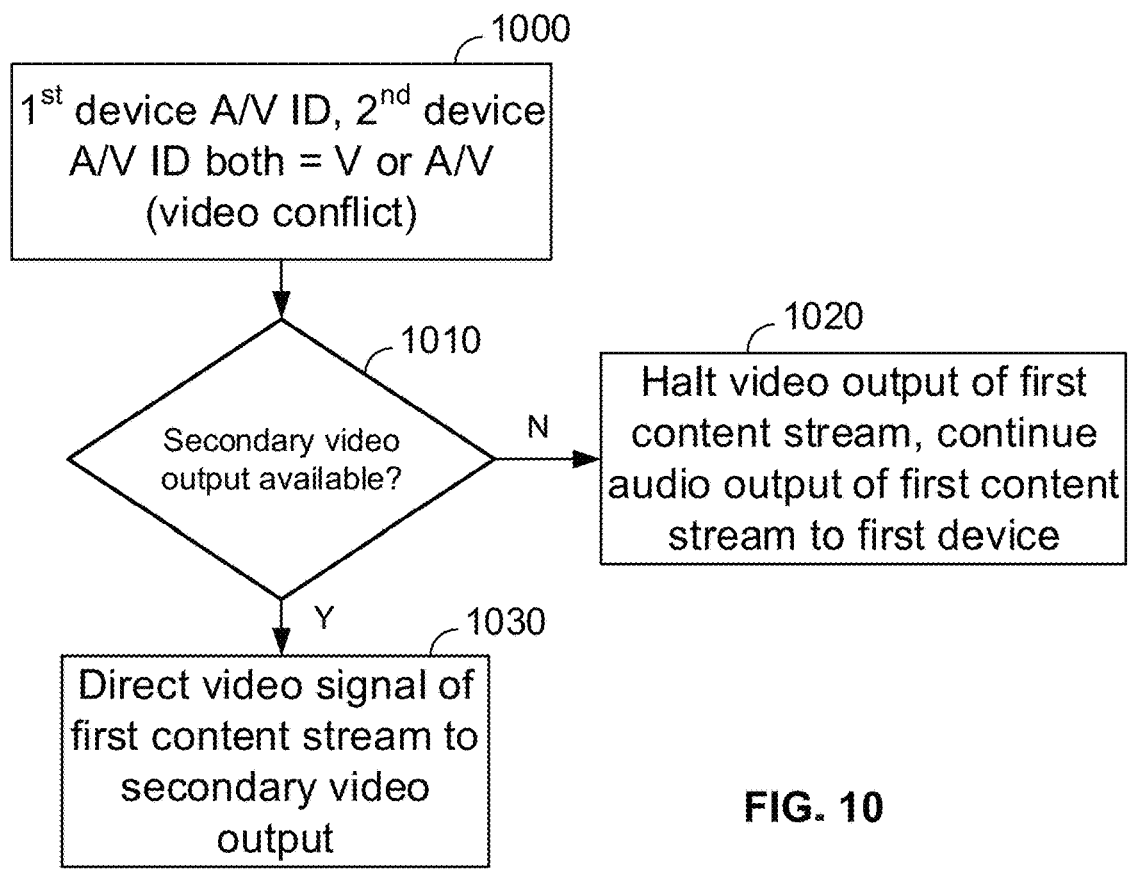
FIG. 10 is a flowchart illustrating process steps for conflict resolution with and without a secondary video output.
Figure 11:
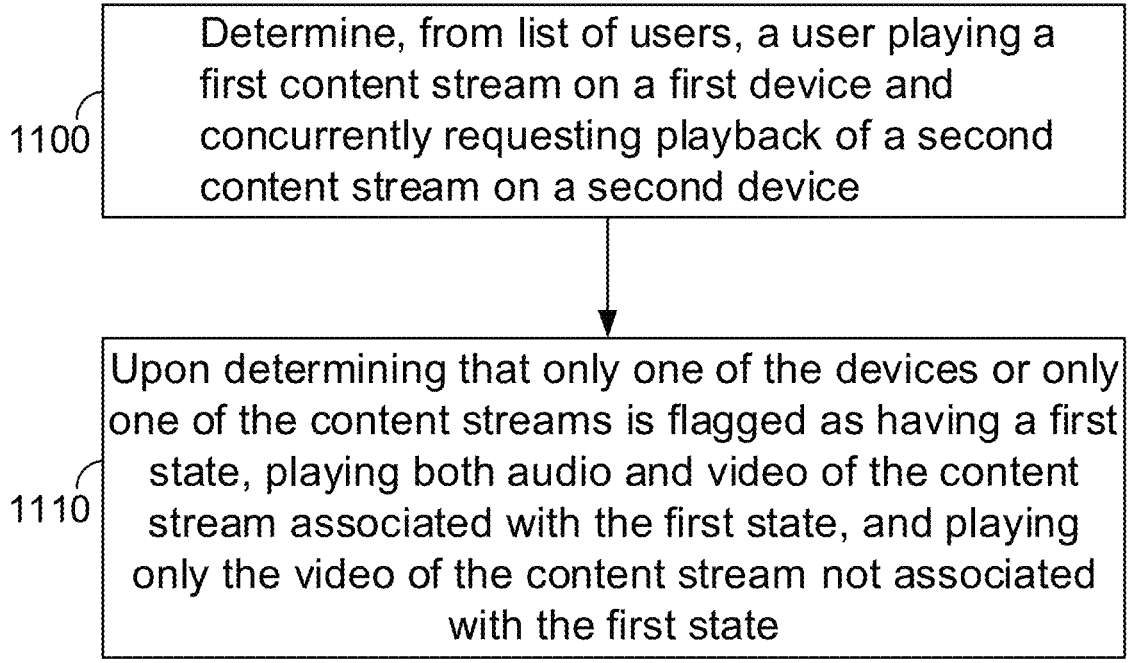
FIG. 11 is a flowchart illustrating process steps for conflict detection and resolution utilizing a first state flag.

As previously described, embodiments of the disclosure contemplate many different conflict resolution processes. Some of these processes involve use of secondary audio and video outputs. FIGS. 9 and 10 illustrate further details of the conflict resolution process when a secondary audio or video output is available. This secondary audio or video output may be any other device that can output video and/or audio streams of the first or second requested content streams. For instance, the secondary audio or video output may be networked speakers in communication with content direction device 120 via local area network 200, another content consumption device 110, 130, or the like.

FIG. 9 is a flowchart illustrating process steps for conflict resolution with and without a secondary audio output. As above, an audio/video type identifier (A, V, or A/V) may be stored for each device currently playing or requesting a content stream. When one user is determined to be requesting first and second content streams on first and second devices 110, 130, the content direction device 120 determines the audio/video type identifier of each device from, e.g., the device manifest of FIG. 5A. The device 120 then determines whether there is an audio conflict, i.e., if the audio/video type identifier associated with the first device and the audio/video type identifier associated with the second device are each A or A/V. If so (Step 900), the content direction device 120 determines whether a secondary audio output is available (Step 910). If no secondary audio output is available, then the device 120 halts audio output of the first content stream and continues video output of the content stream on the first device 110, 130 (Step 920). That is, if no secondary audio output is available, then in the event of an audio conflict, the device 120 plays the requested second stream on the second device 110, 130, and plays only the video stream of the first content stream on the first device 110, 130. Thus, the first content stream is muted while the second content stream plays. In this manner, the user may listen to the second device 110, 130 while continuing to watch the first device 110, 130. Conflict is resolved by playing only one audio stream (the second) for the user, while also playing both video streams.

If a secondary audio output is available, i.e., device 120 determines that another device on local area network 200 is currently capable of and available for audio output, the device 120 directs the audio signal of the first content stream to the secondary audio output (Step 930). If present, the video signal of the first content stream continues to be directed to the first device, and the second content stream is directed to the second device. Thus, the first device plays mute, while the audio of its content stream is sent to the secondary audio output and the second content stream plays on the second device.

FIG. 10 is a flowchart illustrating process steps for conflict resolution with and without a secondary video output. As with FIG. 9 above, when one user is determined to be requesting first and second content streams on first and second devices 110, 130, the content direction device 120 determines the audio/video type identifier of each device from, e.g., the device manifest of FIG. 5A. The device 120 then determines if there is a video conflict, i.e., if the audio/video type identifier associated with the first device and the audio/video type identifier associated with the second device are each V or A/V. If so (Step 1000), then the content direction device 120 determines whether a secondary video output is available (Step 1010), such as by determining whether another device on local area network 200 is currently available for and capable of video output. If none is available, the device 120 halts video output of the first content stream but continues audio output of the first content stream (Step 1020). The second content stream is also played on the second device. Thus, the second content stream is played as normal, while only the audio of the first content stream is played, thus resolving conflict between video outputs. On the other hand, if a secondary video output is available, the content direction device 120 directs the video signal of the first content stream to the secondary video output (Step 1030), while the audio signal of the first content stream continues to be directed to the first device. Meanwhile, the second content stream is streamed to the second device.

When the type identifier of both devices is A/V, that is the conflict is between two streams that each have both audio and video, the processes of both FIG. 9 and FIG. 10 may apply. In this case, the content direction device 120 may use the process corresponding to the available secondary output. That is, if only a secondary audio output is available, the process of FIG. 9 may be used, whereas if only a secondary video output is available, the process of FIG. 10 may be used. If both a secondary audio and a secondary video output are available, the device 120 may utilize either the process of FIG. 9 or that of FIG. 10, as preferred.

Another conflict resolution approach contemplated by embodiments of the disclosure involves use of a state flag that can be referred to as a "conditional audio enabled" (CAE) flag. The conditional audio enabled or CAE flag indicates audio priority in a conflict. When a conflict is deemed to occur, and when one of the devices/streams is flagged as having this audio priority state while the other is not, both audio and video of the flagged device/stream is played, while only the video and not the audio of the unflagged device/stream is played.

The CAE flag can be a setting stored by the content direction device 120 for each of its content consumption devices 110, 130, and may be determined according to properties of the devices 110, 130, or the content they play, in any manner. For example, the content direction device 120 can flag each of its content consumption devices 110, 130 as being in the CAE state based on any criteria, e.g., the flag may be set by the user, the first device a user plays may be flagged CAE if it has audio capability and the first content stream includes an audio stream, or the like. Any one or more criteria are contemplated. Alternatively, the content direction device 120 may determine the setting of the CAE flag by content. For instance, metadata in a requested content stream may indicate whether that content is CAE content or not. The content direction device 120 may also automatically flag certain content as CAE based on various criteria, such as when content has only an audio stream and no video stream.

The CAE flag is used in conflict resolution. Accordingly, the content direction device first determines the UID of the user playing a first content stream on a first device 110, 130 and concurrently requesting playback of a second content stream on a second device 110, 130 (Step 1100). This step may be performed as previously described. It is then determined whether the two content streams present a conflict. If so, the content direction device 120 determines whether only one of the streams or only one of the devices is flagged CAE. If so, then the content direction device 120 plays both audio and video of the content stream associated with the CAE flag, and plays only the video of the content stream not associated with the CAE flag (Step 1110). That is, in a conflict, the device or content stream flagged CAE is played with both audio and video, while the device or content stream not flagged CAE is played without audio.

Figure 12:
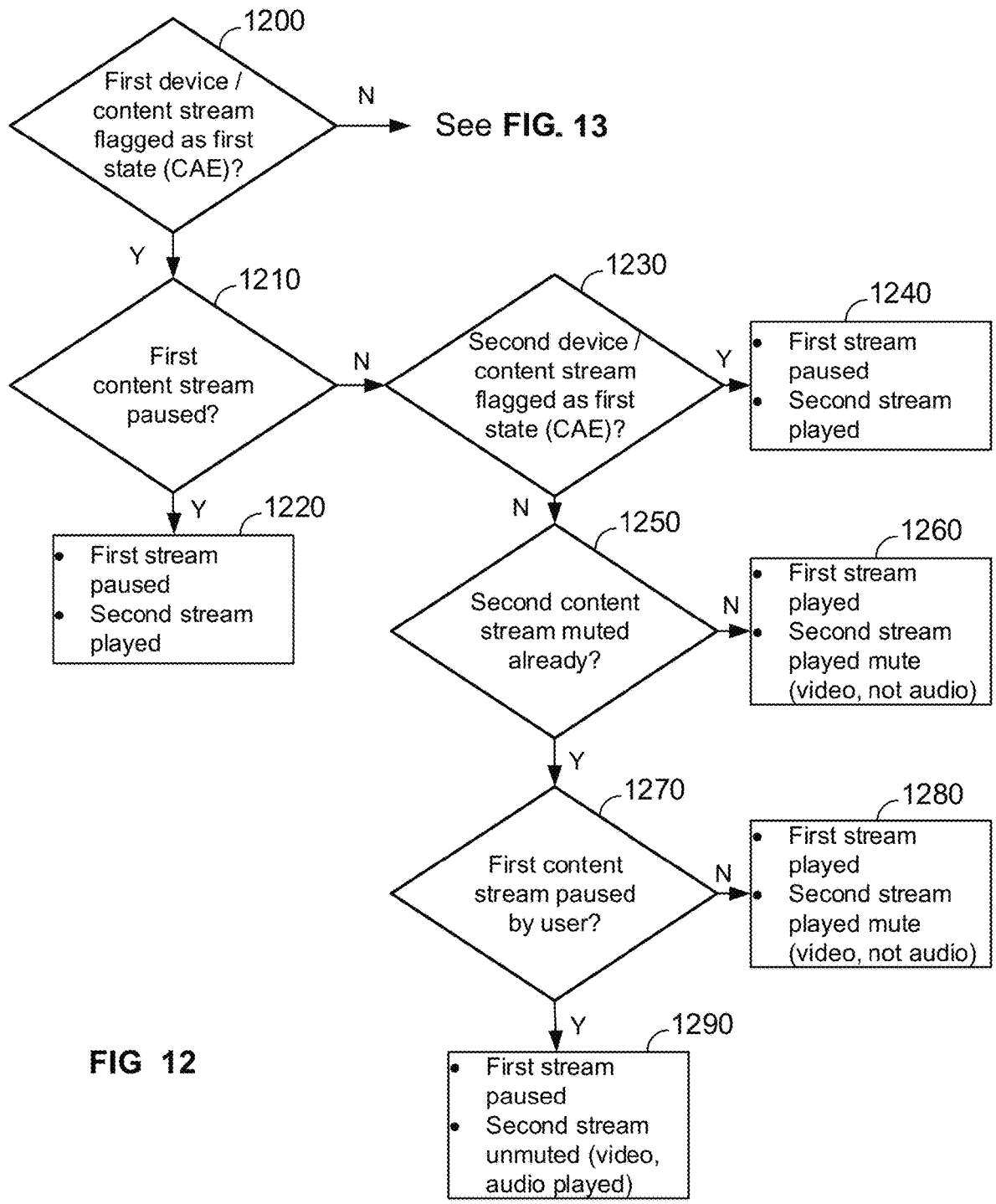
FIGS. 12 and 13 are flowcharts illustrating further details of exemplary conflict resolution processes utilizing the first state flag.
Figure 13:
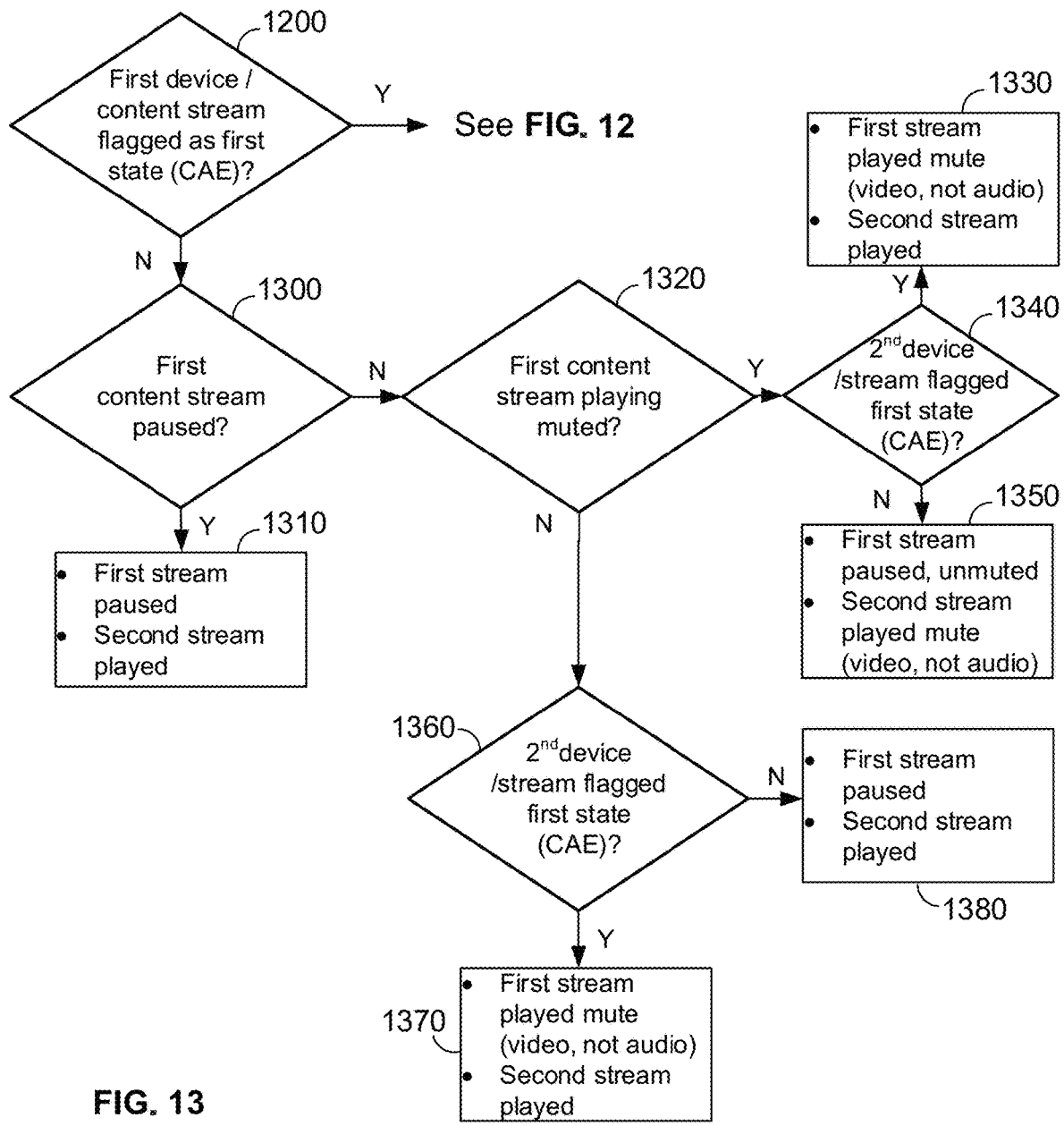

The CAE flag may also be used to resolve other situations that present conflicts. FIGS. 12 and 13 are flowcharts illustrating further details of exemplary conflict resolution processes utilizing the CAE flag. Once a conflict is presented, the content direction device 120 determines whether the first device 110, 130 or content stream is flagged CAE (Step 1200). If not, then the process continues to FIG. 13, which is further explained below. However, if the first device or stream is flagged CAE, the content direction device 120 then determines whether the first content stream is also paused (Step 1210). If so, then the conflict is resolved by keeping the first content stream paused on the first device 110, 130, and playing the second stream on the second device 110, 130 (Step 1220). If the first content stream has not been paused, then the content direction device 120 checks whether the second device 110, 130 or second content stream has been flagged CAE (Step 1230). If so, then the conflict is between two devices/content streams that have both been flagged CAE. In this case, the content direction device 120 pauses the first stream on the first device 110, 130, and plays the second stream on the second device 110, 130 (Step 1240). If not, i.e., if the first device/stream is flagged CAE but the second device/stream is not, then the content direction device 120 checks whether the second content stream has been muted (Step 1250), i.e., is currently playing in a mute state. If not, then conflict is resolved by playing the first stream on the first device 110, 130, and playing the second stream in mute on the second device 110, 130 (Step 1260). That is, the first stream is played back on the first device 110, 130, and only the video stream, not the audio stream, of the second content stream is played on the second device 110, 130.

If the second content stream has already been muted, then the content direction device 120 determines whether the first content stream has been paused by the user (Step 1270). If so, i.e., if the conflict is between a paused first content stream flagged CAE and a muted second content stream not flagged CAE, then the first stream is kept in its paused state while the second content stream is unmuted (Step 1290). That is, conflict is resolved by keeping the first content stream paused and unmuting the second content stream, so that both its audio and video are played back. If, on the other hand, the first content stream has not been paused by the user, then the conflict is instead resolved by playing the first content stream on the first device 110, 130 and playing the second stream in mute on the second device 110, 130 (Step 1280). Thus, if the conflict is between a (non-paused) first content stream flagged CAE and a muted second content stream not flagged CAE, then the conflict is resolved by continuing play of the first content stream and muting the second content stream.

Returning to Step 1200, if the first device 110, 130 or first content stream is not flagged CAE, then the process proceeds to FIG. 13, where the content direction device determines if the first content stream has been paused (Step 1300). If so, then the conflict is resolved by continuing to pause the first content stream on the first device 110, 130, and playing the second content stream on the second device 110, 130 (Step 1310). However, if the first content stream has not been paused, i.e., if the first content stream is currently playing when a conflict is determined, then the content direction device 120 determines whether the first content stream is playing in mute, or only the video stream but not the audio stream of the first content stream is being played (Step 1320). If so, then the content direction device 120 checks whether the second device 110, 130 or second content stream is flagged CAE (Step 1340). If it has, then conflict is resolved by playing the first stream mute on the first device 110, 130, and playing the entire second content stream on the second device 110, 130 (Step 1330). On the other hand, if the second device 110, 130 or second content stream is not flagged CAE, then conflict is resolved by unmuting the first content stream and playing the second content stream on mute (Step 1350). Thus, if the conflict is between a first non-CAE content stream playing mute and a second content stream flagged CAE, the first stream is kept in its mute state while the second stream is played in its entirety (audio and video). Alternatively, if the conflict is between two non-CAE streams, the first of which is already muted, then the conflict is resolved by pausing and unmuting the first stream and playing the second stream on mute.

If, after Step 1320, the first content stream is not muted, then the content direction device checks whether the second content stream or second device 110, 130 is flagged CAE (Step 1360). If so, i.e., if the conflict is between a first content stream not flagged CAE and a second content stream flagged CAE, then the first stream is muted and played, while the second stream is played (Step 1370). That is, the non-CAE content stream is muted but its video is played, and both the audio and video of the CAE content stream are played. On the other hand, if neither the first device/stream nor the second device/stream is flagged CAE, then the conflict is between two non-CAE devices/streams. In this case, the content direction device 120 resolves the conflict by pausing the first stream on the first device 110, 130, and playing the second stream on the second device 110, 130 (Step 1380).

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, the determination of user identity for each requested content stream may be performed in any manner, as can the comparison of content to a user profile. Likewise, embodiments of the disclosure contemplate any approach to resolving conflicts for any two content streams, whether by a CAE or other flag, or by any other approach to determining the priority of each content stream. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method of resolving conflicts when a user requests playback of multiple content streams, the method comprising:
    receiving, from a user of a list of users, a playback request for a second content stream on a second device;
    determining that the user is concurrently playing a first content stream on a first device; and
    upon determining that only one of the content streams has an audio priority flag, wherein the audio priority flag is embedded in the metadata of only one of the content streams, playing both audio and video of the content stream associated with the audio priority flag, and playing only the video of the content stream not associated with the audio priority flag.

2. The method of claim 1, wherein the audio priority flag is a conditional audio enabled state indicating priority of an associated audio signal over an audio signal of content not flagged as having the audio priority flag.

3. The method of claim 2, wherein the conditional audio enabled state is a state of one of the first and second devices.

4. The method of claim 2, wherein the conditional audio enabled state is a state of one of the first and second content streams.

5. The method of claim 1, further comprising:
    upon determining that both the first device and the second device, or both of the content streams, are flagged as having the audio priority flag, pausing playback of the first content stream on the first device and playing back the second content stream on the second device.

6. The method of claim 1, further comprising:
    upon determining that both the first device and the second device, or both of the content streams, are flagged as having the audio priority flag, and determining that playback of the first content stream has been paused, maintaining the paused state of the first content stream and playing back the second content stream on the second device.

7. The method of claim 1, further comprising:
    upon determining that neither the first device nor the second device, and neither the first content stream nor the second content stream, are flagged as having the audio priority flag, pausing playback of the first content stream on the first device and playing back the second content stream on the second device.

8. The method of claim 1, further comprising:
    upon determining that the first device or the first content stream is flagged as having the audio priority flag, the first device is playing the video but not the audio of the first content stream, and the second device and the second content stream are not flagged as having the audio priority flag:
        pausing playback of the video of the first content stream;
        playing the audio of the first content stream; and
        playing the video but not the audio of the second content stream.

9. The method of claim 1, further comprising:
    upon determining that the first device or the first content stream is flagged as having the audio priority flag, the second device and the second content stream are not flagged as having the audio priority flag, the second device is playing the video but not the audio of the second content stream, and receiving a request to pause playback of the first content stream:
        pausing the first content stream; and
        playing the audio of the second content stream, so that the second device plays the video and the audio of the second content stream.

10. The method of claim 1, further comprising:
    designating the respective first and second content streams, or the respective first and second devices, as having the audio priority flag if the respective first and second content streams comprise the audio but not the video.

11. A system for resolving conflicts when a user requests playback of multiple content streams, the system comprising:
    a storage device; and
    control circuitry configured to:
        receive, from a user of a list of users, a playback request for a second content stream on a second device;
        determine that the user playing a first content stream on a first device and concurrently requesting playback of a second content stream on a second device; and
        upon determining that only one of the content streams has an audio priority flag, wherein the audio priority flag is embedded in the metadata of only one of the content streams, play both audio and video of the content stream associated with the audio priority flag, and play only the video of the content stream not associated with the audio priority flag.

12. The system of claim 11, wherein the audio priority flag is a conditional audio enabled state indicating priority of an associated audio signal over an audio signal of content not flagged as having the audio priority flag.

13. The system of claim 12, wherein the conditional audio enabled state is a state of one of the first and second devices.

14. The system of claim 12, wherein the conditional audio enabled state is a state of one of the first and second content streams.

15. The system of claim 11, wherein the control circuitry is further configured to:
upon determining that both the first device and the second device, or both of the content streams, are flagged as having the audio priority flag, pause playback of the first content stream on the first device and play back the second content stream on the second device.

16. The system of claim 11, wherein the control circuitry is further configured to:
upon determining that both the first device and the second device, or both of the content streams, are flagged as having the audio priority flag, and determining that playback of the first content stream has been paused, maintain the paused state of the first content stream and play back the second content stream on the second device.

17. The system of claim 11, wherein the control circuitry is further configured to:
upon determining that neither the first device nor the second device, and neither the first content stream nor the second content stream, are flagged as having the audio priority flag, pause playback of the first content stream on the first device and play back the second content stream on the second device.

18. The system of claim 11, wherein the control circuitry is further configured to:
upon determining that the first device or the first content stream is flagged as having the audio priority flag, the first device is playing the video but not the audio of the first content stream, and the second device and the second content stream are not flagged as having the audio priority flag:
pause playback of the video of the first content stream;
play the audio of the first content stream; and
play the video but not the audio of the second content stream.

19. The system of claim 11, wherein the control circuitry is further configured to:
upon determining that the first device or the first content stream is flagged as having the audio priority flag, the second device and the second content stream are not flagged as having the audio priority flag, the second device is playing the video but not the audio of the second content stream, and receiving a request to pause playback of the first content stream:
pause the first content stream; and
play the audio of the second content stream, so that the second device plays the video and the audio of the second content stream.

20. The system of claim 11, wherein the control circuitry is further configured to:
designate the respective first and second content streams, or the respective first and second devices, as having the audio priority flag if the respective first and second content streams comprise the audio but not the video.

* * * * *